Jan. 6, 1953  E. I. GHORMLEY  2,624,303
MACHINE FOR METALWORKING
Filed July 6, 1948  4 Sheets-Sheet 3

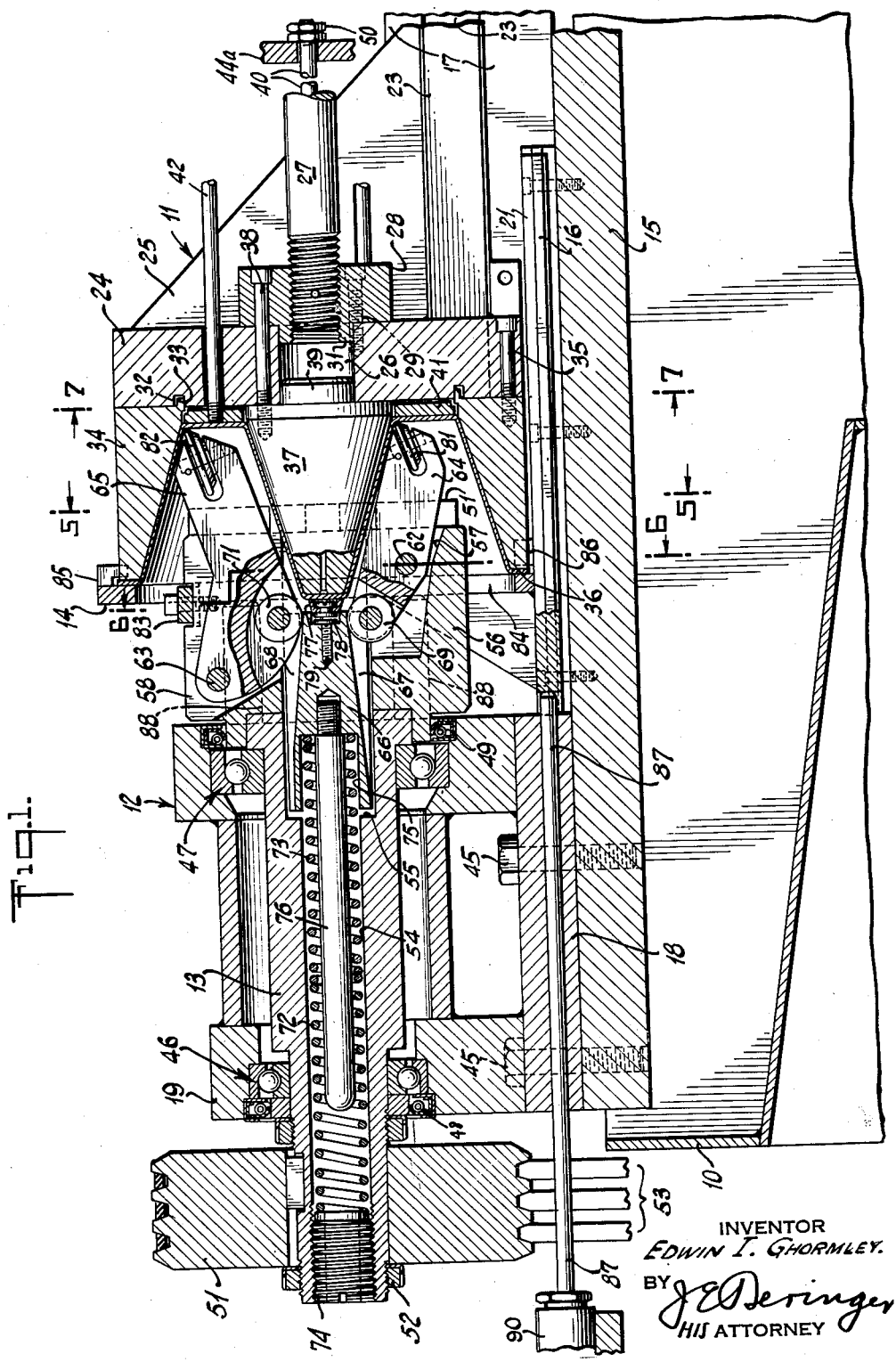

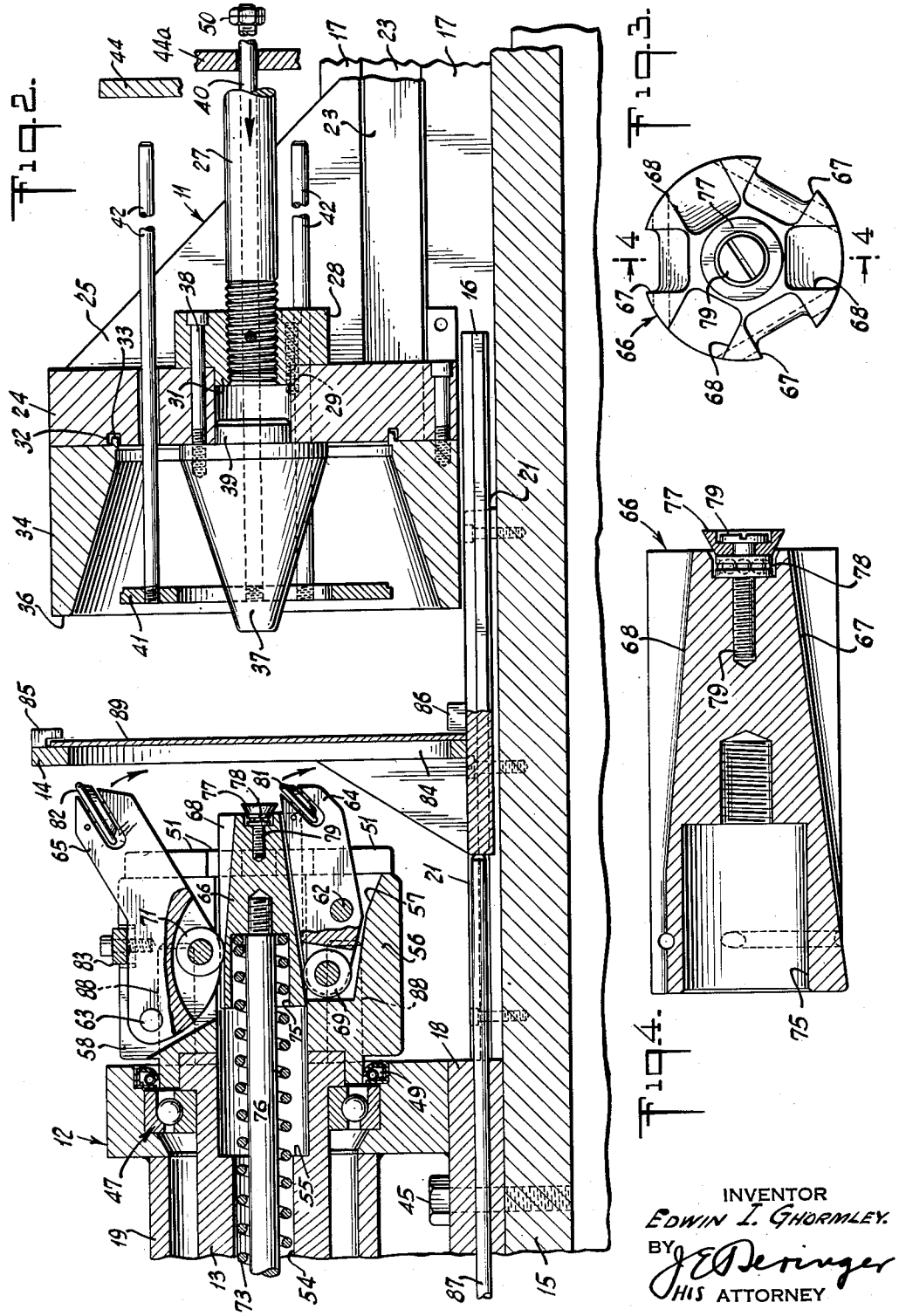

INVENTOR
EDWIN I. GHORMLEY.
BY JEDeringer
HIS ATTORNEY

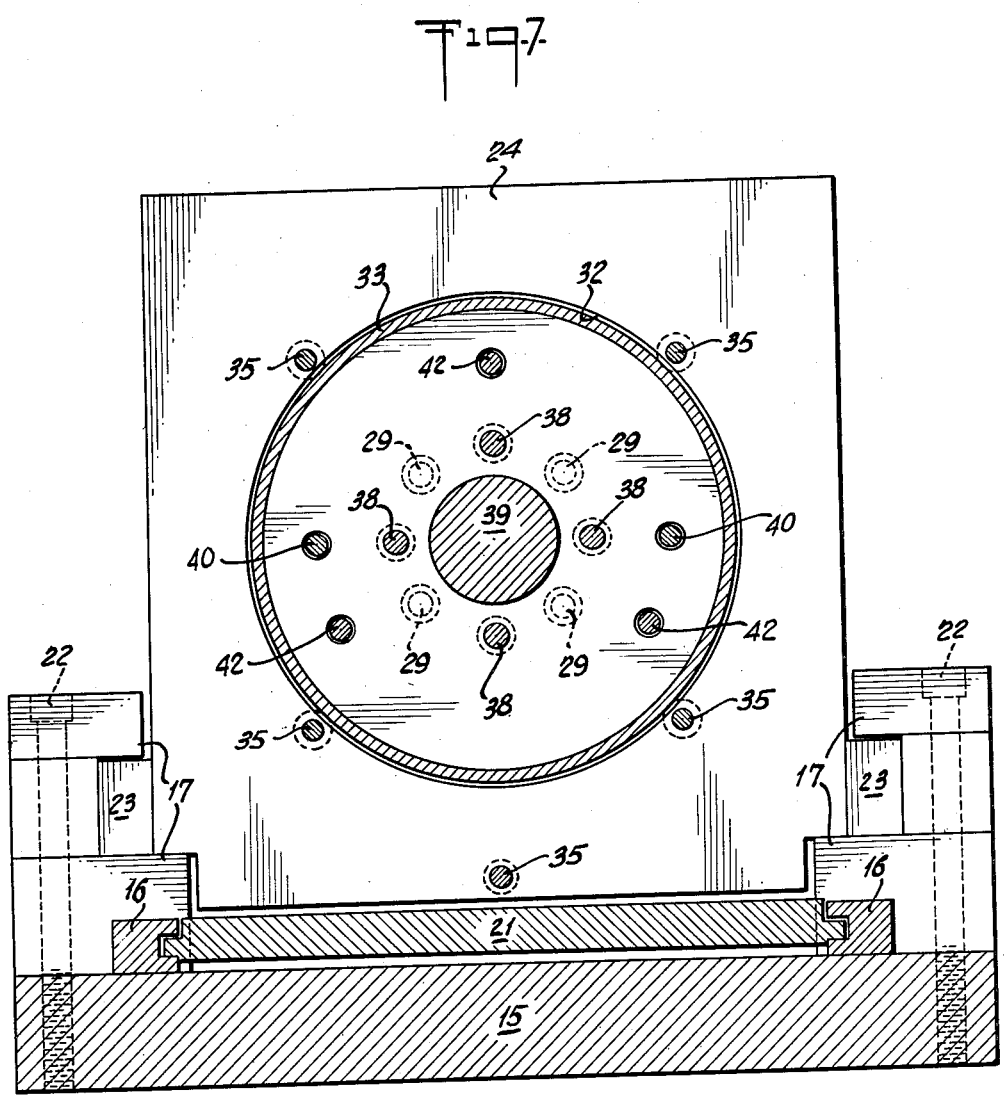

Patented Jan. 6, 1953

2,624,303

UNITED STATES PATENT OFFICE 2,624,303

MACHINE FOR METALWORKING

Edwin I. Ghormley, Dayton, Ohio, assignor to United Aircraft Products, Inc., Dayton, Ohio, a corporation of Ohio Application July 6, 1948, Serial No. 37,163

9 Claims. (Cl. 113—52)

This invention relates to machinery for shaping sheet metal, and particularly to the working of sheet metal to form unitary one-piece baking pans and the like.

The invention has especial, although not limited, character as a modification of that class of devices which by the application of rolling and pressing or spinning pressures form, in a flat metal blank one or more relatively deep recesses having tapered side walls, the material of the side walls being elongated with the result that it is relatively thinner than the material at the top and bottom of the recesses. Various articles of manufacture are made by this process including baking pans, the method having particular value in the latter application. A pan so produced is easy to clean because of its one-piece construction and the relatively thin side walls permit a more uniform and efficient heat exchange.

By the present invention, the apparatus for carrying out this method of metal working specifically is improved and a new form thereof presented whereby the metal blank may in one operation be shaped with a plurality of oppositely inclined side walls. One application of the new method and apparatus of the invention is in the manufacture of baking pans used in preparing angel food cakes, these devices being characterized by a central frusto-conical wall and an oppositely inclined outer wall. The invention is disclosed as embodied in a machine for making such pans.

Among the objects of the invention are to form deep annular recesses in a sheet metal blank, to produce in a single operation a seamless article of manufacture characterized by radially spaced oppositely inclined side walls, and in general to provide new and improved machinery for carrying out the above objects. The method of making such article of manufacture is disclosed and claimed in my copending application, Ser. No. 41,043, filed July 28, 1948 for Method of Making a Baking or Like Pan.

Other objects and structural details of the invention will appear from the following description when read in connection with the accompanying drawings, wherein:

Fig. 1 is a view in longitudinal section of the machine, taken through the anvil or die head and the pressing head, and showing the parts as they appear at the end of the pan shaping stroke;

Fig. 2 is a view similar to Fig. 1, showing the parts as they appear shortly after the start of the pan shaping stroke;

Fig. 3 is a detail view in end elevation of a cam element comprised in the pressing head;

Figure 5:
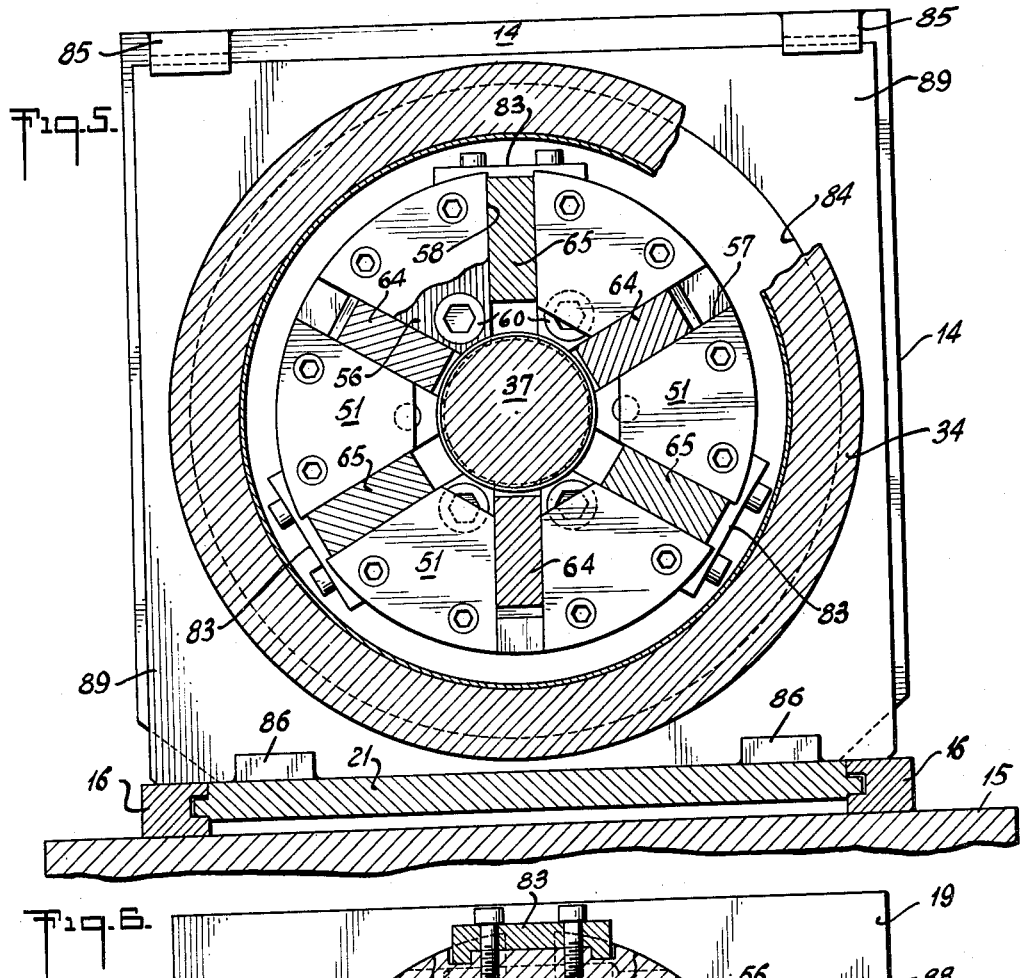
Figure 6:
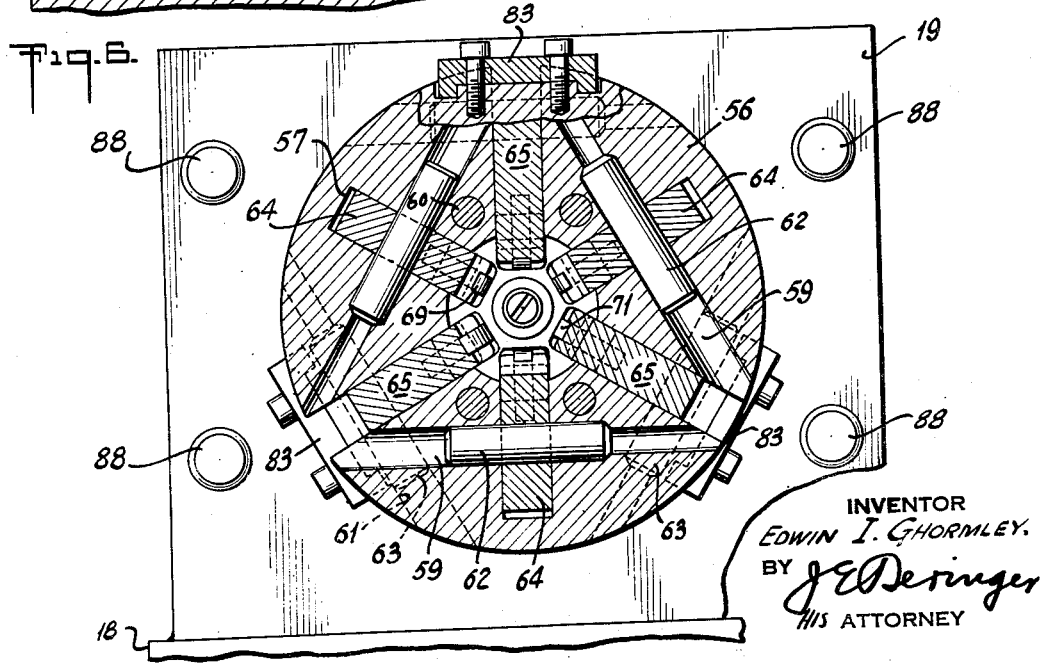

Fig. 4 is a view in longitudinal section taken along the line 4—4 of Fig. 3; and Figs. 5, 6, and 7 are views in cross-section, taken substantially along the respective lines 5—5, 6—6 and 7—7 of Fig. 1.

Referring to the drawings, the illustrated parts of the machine comprise generally a support 10, an anvil or die head 11, a presser head 12 including a spindle 13, and a blank holder 14 between the die 11 and presser head 12.

The die head and the presser head are oppositely disposed for relative rotary and longitudinal movements. In the illustrated embodiment of the invention, the die 11 is reciprocable upon the support 10, the spindle 13 is rotatable and the blank holder 14 has a reciprocable motion under the control of the die head. The power sources for effecting these operations have been, in the interest of simplicity of disclosure, omitted from the drawings. These comprise a hydraulic cylinder for shifting the die head 11, an electric motor for rotatably driving the spindle 13 and a resilient pressure means such as a spring or compressed air accumulator for moving the blank holder 14.

Referring to the machine in greater detail, the support 10 includes a base 15 to the upper end of which are secured spaced guideways 16, additional guideways 17 (see Fig. 7) and a plate 18 upon the latter of which is mounted a housing 19 for the spindle 13 of the presser head 12. The guideways 16 have an interfitting engagement with a plate 21 (see Figs. 5 and 7) to which plate is secured the blank holder 14. The plate 21 is slidable within the guideways 16. Guideways 17 are secured to the base 15 by bolts 22 and receive tenons 23 integral with the die head for guided reciprocating motion thereof.

The die head 11 comprises a block 24 generally rectangular in shape and formed with rearwardly extending spaced ribs 25 with which the tenons 23 are integrally formed. The block 24 has a central opening 26 receiving one end of a shaft 27 extending at its other end, in a manner not here shown, to the aforementioned hydraulic cylinder. The shaft 27 is threaded into engagement with a nut 28 seated against the rear face of block 24 and held thereagainst by bolts 29. A lock nut 31 within recess 26 holds the shaft 27 against movement relative to the nut 28. Accordingly, axial motion of the shaft 27, induced by operation of the hydraulic cylinder, is partaken of by the block 24 and associated parts, such motion being guided and controlled by sliding of the tenons 23 within the guideways 17. The front face of the block 24 is flat except for an annular recess 32 adapted and arranged to receive a flange 33 on the rear of an anvil ring 34. The anvil 34 is seated flush against the block 24 and held thereto by bolts 35 extending through the block and into the anvil. The anvil has a ring-shape with an outside diameter which is parallel to the axis thereof and an inside diameter which tapers from a maximum width at the outer end of the anvil to a minium width at the inner end of the anvil. The sloping internal wall of the anvil terminates short of the periphery of the anvil at the outer end thereof to define a land 36. Centrally positioned within the anvil 34 and spaced from the sloping side walls thereof, is a frusto-conical anvil 37. The base of anvil 37 seats against the block 24 and is held thereto by bolts 38 passed through nut 28, block 24 and into the anvil 37. The anvil 37 is centered relatively to the block 24 and the anvil 34 by an integral stud 39 received in the recess 26 in block 24. The frustrum of the cone defined by anvil 37 projects beyond the plane of the land 36 on anvil 34.

The anvils 34 and 37 define therebetween an annular space, at the bottom of which is a ring 41 limiting against an internal ledge on the flange 33 of anvil 34 and substantially seating upon the front face of block 24. The ring 41 has connected thereto a plurality of rods 42 which extend rearwardly through the block 24 toward cooperative engagement with a fixed stop 44, a fragment of which is shown in Fig. 2. The construction and arrangement of these parts is such that at a predetermined point in the motion of the die head in a retracting or right hand direction as viewed in Fig. 1, the rods 42 abut stop 44. Continued retracting motion of the die head accordingly is accomplished relatively to the ring 41 which thereby acts to eject the finished pan from the machine, as will hereinafter more clearly appear. A second set of rods 40 is anchored to the ring 41 and extends rearwardly through another part 44a of the fixed stop 44. The rods 40 have nuts 50 on their free ends engageable with the part 44a to limit outward or left hand travel of the ring 41.

In the presser head 12 the housing 19 is secured to plate 18 by bolts 45. The spindle 13 is hollow and extends longitudinally through housing 19, being supported therein by roller bearings 46 and 47. Outside the respective bearings 46 and 47 are packing seal assemblies 48 and 49. These inhibit a flow of oil along the spindle 13, the rolling and pressing operation being carried out in the presence of an oil spray. The outer end of spindle 13 extends through and beyond housing 19 and has keyed thereto a pulley 51, held in place upon the spindle by a lock nut 52. The pulley 51 has belts 53 wound thereon, the belts also encompassing a driving wheel (not shown) operatively connected to the aforementioned electric motor. Operation of the electric motor accordingly drives pulley 51 and spindle 13 in a rotary direction.

The spindle 13 has a longitudinal bore 54 therein and at its inner end, or that end adjacent the die head, is formed with a counterbore 55. The inner end of the spindle projects through and beyond housing 19 and has attached thereto, as by bolts 60 (see Figs. 5 and 6), an enlarged circular head 56. The head 56 may, if desired, be made integral with the spindle 13 but in the machine illustrated is a separate element having a central opening registering with counterbore 55. Opening through the front of head 56 is a series of three slots 57 and another series of three slots 58. The slots 57 and 58 are concentric with regard to the axis of the spindle 13. As shown in Fig. 5, the slots 58 extend through the periphery of the head 56 and into the counterbore 55 while the slots 57 also open into the counterbore 55 but terminate short of the periphery of the head 56. The several slots are alternately arranged in a circumferential direction about the head 56. That is, between each slot 57 is a slot 58 and vice versa. Further, the slots 57 and 58 are diametrically opposed, and in the manufacture of the head 56 a single cut is taken therethrough to form one slot 57 and its opposed slot 58. For purposes of the present description, however, it has been assumed that there are present in the head, three separate sets of slots 57 and 58.

The head 56 is intersected transversely by a first set of bores 59 in one vertical plane and by a second series of bores 61 in another vertical plane rearwardly of the first. The several bores 59 and 61 extend at right angles through respective slots 57 and 58 and lie in spaced, jointly surrounding relation to the axis of the head 56. The bores 59 and 61 further are counterbored to receive respective studs 62 and 63. The studs 62 provide pivotal support for a set of presser arms 64 and the studs 63 provide pivotal support for a set of presser arms 65. The arms 64 and the arms 65 are arranged in the respective slots 57 and 58 and extend forwardly through and beyond the front of head 56. The arrangement is such as to present three presser arms 64 converging toward the axis of the head 56 and three presser arms 65 diverging from the axis of head 56 (see Fig. 2).

Reciprocable within the counterbore 55 of spindle 13 is a cam element 66 (see also Figs. 3 and 4). The element 66 is circular in shape for a loosely sliding fit in counterbore 55 and is formed with six circumferentially spaced, longitudinal, peripheral grooves arranged in two sets of three each and alternately disposed in correspondence with the alternating positions of the presser arms 64 and 65. Thus, the cam element 66 has a set of grooves 67 lying opposite respective arms 64 and a set of grooves 68 lying opposite respective arms 65. The grooves 67 and 68 have a longitudinally tapering formation giving to each a maximum depth at the front end of element 66 and a minimum depth at the rear of element 66, the respective tapers being formed in determined relation to the slope of the wall of anvil 37 and the inner wall of anvil 34 of the die head. There is mounted on each presser arm 64, a roller 69 extending into a groove 67 in cam element 66 and there is mounted on each arm 65 a roller 71 extending into a groove 68 in the cam element. In the case of arms 64, the rollers 69 are arranged on the inner ends thereof, these arms being pivotally mounted intermediate their ends upon the studs 62. The rollers 71 on arms 65 are arranged between the ends of the arms, these arms being pivotally mounted at their inner ends upon the studs 63.

The cam element 66 is reciprocable between the sets of arms 64 and 65 to effect a rocking motion of these arms about their respective pivots. The cam is movable outwardly or forwardly of the arms 64 and 65 by spring means disposed in the bore 54 of spindle 13. This spring means comprises two compression springs 72 and 73 arranged in end to end abutting relation. At its one end, the spring assembly limits against plug 74 screwthreaded into the outer end of bore 54 and at its other end is received in a recess 75 in the end of cam element 66. A guide pin 76 also is received in the recess 75 and is screwthreaded into the cam element 66, the pin 76 extending rearwardly within bore 54 and being surrounded by the springs 72 and 73. The cam element 66 is moved in a rearward or inward direction relative to the arms 64 and 65 by die head 11. In the illustrated embodiment of the invention, this is accomplished by indirect contact of the frustrum of anvil 37 with the end of cam 66. The cam 66 and anvil 37 are in axial alignment and there is mounted upon the end of element 66 an anti-friction bearing comprised of a friction plate 77 engageable with anvil 37, a roller bearing 78 between plate 77 and cam 66 and a screw 79 connecting plate 77 and bearing 78 to the cam element 66. According to this arrangement, the cam element 66, which rotates with spindle 13, may be pressed against anvil 37 without damage to the intermediate sheet metal blank, the plate 77 being frictionally held against rotation while the axial and rotary thrusts involved are absorbed by bearing 78.

The outer ends of the arms 64 and 65 are slotted and have rotatably mounted therein pressing rolls indicated respectively at 81 and 82. The rolls 81 and 82 are disc-shaped and have a curved and sloping formation designed for efficient rolling and pressing of the sheet metal, the peripheries of the rolls being presented for contact with the work.

Rocking motion of the arms 64 and 65 is controlled by engagement of the respective rollers 69 and 71 with the cam element 66. In the case of arms 65, as an aid to limiting outward rocking motion thereof, there may be provided stops in the form of bars 83 secured within peripheral recesses in the head 56.

The element 14 is disposed between the die head and the pressing head, and, as before mentioned, functions as a holder for the sheet metal blank to be shaped. The holder 14 has a substantially square shape and is formed with a large circular opening 84 to permit the passage of head 56 and arms 64 and 65 therethrough. The blank holder stands in an upright position upon plate 21, to which it is fixed, and there may be associated therewith spaced lugs 85 and 86 to hold the metal blank against the face of the holder. The lugs 85 are integral with the holder 14 while the lugs 86 are set in the plate 21. The plate 21 and holder 14 mounted thereon are moved relatively to the guideways 16 under the joint control of the die head 11 and of a rod 87 extending longitudinally through the plate 18 into abutting engagement with the rear edge of the plate 21. The rod 87 extends rearwardly of the plate 18 and into cooperative relation with a resilient pressure applying means which may be a spring or a source of compressed air. In the present machine the rod 87 is connected to an air cylinder 90 wherein a continuous relatively low pressure is applied in a direction to urge the rod 87, the plate 21 and holder 14 toward the die head 11 or in a right hand direction as viewed in Fig. 1. The blank holder has a limited movement in this direction, defined by the air cylinder, which movement is less than the rearward travel imparted to the die head. Motion of the holder 14 in an opposite direction is limited by studs 88 fixed in housing 19. The holder 14 is adapted and arranged for contact with the land 36 on the front end of anvil 34. During the forward motion of the anvil 34 toward the pressing head, land 36 may engage holder 14 and move it rearwardly against the action of the aforesaid resilient pressure force. During the retracting stroke of the die head, the holder 14 follows the anvil 34 until its limit of motion in that direction is reached whereupon the anvil 34 moves away from the plate holder. The position of the parts attained when the die head is at the end of its retracting stroke may be more clearly understood from Fig. 2, although this view is intended to show the die head moving toward the work.

With the machine at rest, the parts assume approximately the positions shown in Fig. 2 wherein axial retracting motion of the die head 11 has separated the die head from the presser head and separated the anvil 34 from the blank holder 14 which stands at the limit of its outward motion. At this time, the cam element 66 is under the sole control of the springs 72 and 73 and accordingly stands in its farthermost outer position. In so moving, the cam has rocked the arms 64 in a convergent direction to move the rolls 81 thereon toward the axis of the head 56 and in line with the edge of the frustrum of anvil 37. The arms 65 have been spread apart by cam 66 in a divergent direction to move the rolls 82 away from the axis of head 56 and in line with the inner edge of land 36 defining the start of the internal slope of anvil 34.

Preparatory to starting the working stroke of the machine, a sheet metal blank, indicated at 89 in Fig. 2, is placed against the holder 14 on that side facing the die head. If lugs 85 and 86 are present in the installation, the blank 89 is placed between these lugs and holder 14. There is then set in motion the hydraulic cylinder operable upon shaft 27. The shaft 27 is moved thereby forwardly or in a left hand direction as viewed in Figs. 1 and 2, and, in the course of such movement, the frustrum of anvil 37 contacts the metal blank 89. Continued motion of the die head thus serves to move the blank 89 and holder 14 toward the presser head against the relatively low resilient pressure applied in opposition through rod 87. At or about the same time forward motion of the die head is initiated, rotary motion of the spindle 13 is begun. The arms 64 and 65 partake of such rotary motion and revolve in the planes indicated in Fig. 2 about the axis of the spindle. As the die head approaches the pressing head, the rolls 81 and 82 of the presser arms engage the metal blank 89, the first said set engaging the blank adjacent the center thereof and the second said set engaging the blank adjacent the periphery thereof. Under the influence of continuously applied axial pressure by the die head, the blank 89 is forced by the presser arms to a seat upon land 36. In response to further rotation of the presser arms, the metal of the blank is pressed against the sloping walls of the respective anvils 34 and 37 and caused to assume the formation defined by the anvils. At or about the same time that the rolls 81 and 82 on the presser arms engage the metal blank 89, the anvil 37 through the blank engages the friction plate 77 on cam element 66. Further axial movement of the die head accordingly results in a retracting or left hand direction of movement, as viewed in Fig. 1, of the cam element 66. The rollers 69 and 71 are enabled thereby to follow the descending slope of the grooves 67 and 68 in the cam with the result that the rolling and pressing pressure applied by the rolls 81 on arms 64 is developed gradually outward from the axis of the spindle whereas the similar pressure applied by rolls 82 on arms 65 develops gradually inward. The motion of the presser arms under the action of cam 66, is, as before mentioned, keyed to the slope of the anvils 34 and 37 in such wise that the rolls 81 and 82 follow the contour of the anvils and press the metal of the blank closely against the sloping walls thereof. The forward motion of the die head 11 is limited by the stops 88, or by other suitable means operable to interrupt the stroke of the die head when the rolls 81 and 82 on the presser arms have reached the bottom of the annular recess between anvils 34 and 37.

It will be observed that the action of the presser arms is such as to be without effect on that area of the metal blank which is not engaged by the arms. This area, which is annular in shape, separates the shaped walls of the blank and defines the bottom of the baking pan produced by the operation. That area of the metal blank acted upon by arms 64 conforms to the shape of the frusto-conical anvil 37 and is caused thereby to assume a cooperating shape and this area accordingly becomes the central cone of the pan. The area of the metal blank acted upon by arms 65 is made to conform to the slope of the internal wall of anvil 34 and this area of the blank accordingly becomes the side wall of the pan. The area of the metal blank resting upon land 36 is clamped between the land and the holder 14 and becomes the rim of the pan and may lie parallel to the bottom. It will be further noted and understood that the action of the rolls 81 and 82 against the counterpressure applied by the anvils 34 and 37 is such as to draw or extrude the metal acted upon without adding to or taking away from the metal of the rim and of the bottom. In consequence, and as seen in Fig. 1, the outer wall of the pan and the central cone thereof are relatively thinner than the rim and bottom portions of the pan.

When the pan has been so formed in the mold defined by anvils 34 and 37, a retracting stroke of the die head 11 is initiated and rotary motion of the spindle 13 may be discontinued. The anvils 34 and 37 accordingly move away from the presser arms 64 and 65 and return to the position shown in Fig. 2. The blank holder 14 follows the return motion of the die head until the limit of its motion is reached whereupon the die head continues on independently of the holder. The distance of retraction of the die head and the limit placed upon the following motion of the holder 14 is such as to provide at the end of the return stroke of the die, a space of sufficient width between the die and the holder 14 as to permit withdrawal of the finished pan from the machine.

The previously described ejector ring 41 is used to simplify withdrawal of the pan. This ring, under the control of rods 42 limiting against stop 44, occupies a forward position near the outer ends of the anvils 34 and 37 when the die head is fully retracted. As the die head advances on its working stroke, however, the rods 42 move away from the stop 44, permitting the ring 41 to be withdrawn into the die mold. Such withdrawal is effected by rods 40, the nuts 50 thereon engaging stop 44a to limit forward travel of ring 41. The relation of the forward travel of the die head to the length of the rods 40 is such as to place the ring 41 approximately at the bottom of the annular recess in the die head. Then, as the metal blank 89 is forced into the die mold, the ring 41 is pressed inward thereby to the seated position shown in Fig. 1. Now when the die head moves in its return stroke, the rods 42 near the end of such stroke engage stop 44 so that continued motion of the head is accomplished relative to the ring 41 with the result that the pan within the die mold is ejected.

It is possible to move the ejector ring 41 into its seated position in the die mold by pressure of the blank 89 alone, but the rods 40 perform a safety function should the machine be operated without a blank 89 therein.

As the metal blank 89 comes from the machine it is in need of trimming about the rim and it is also necessary to cut away the metal closing the frustrum of the center cone. These operations are performed simultaneously in a punch press and the pan is thereafter prepared for packing and shipment.

What is claimed is:

1. A machine for shaping metal baking pans characterized by a frusto-conical central wall and an oppositely inclined outer wall, comprising oppositely disposed die and head members relatively movable in longitudinal and rotative directions, said die member presenting walls corresponding to the walls of the pan, means for holding a metal blank against the face of said die member between said member and said head member, a plurality of first presser arms pivotally mounted on said head and extending into cooperative relation with the central wall of said die member, a plurality of second presser arms pivotally mounted on said head and extending into cooperative relation with the outer wall of said die member, the outer ends of said arms being constructed and arranged to contact and press upon the intermediate metal blank, and means operable concomitantly with relative movement of said die and head members toward each other to move said first presser arms pivotally to follow the slope of said central wall and to move said second presser arms pivotally to follow the slope of said outer wall.

2. A machine for shaping metal baking pans characterized by a frusto-conical central wall and an oppositely inclined outer wall, comprising a rotatable head member, a first set of presser arms, pivotally mounted on said head, a second set of presser arms pivotally mounted on said head, said sets of arms being concentrically arranged about the longitudinal axis of said head, a cam reciprocable centrally of said arms, rollers on said arms riding on said cam and so arranged on said arms as to produce respectively opposite rocking motions of said first and second sets of arms in response to movement of said cam, a die member having walls corresponding to the walls of the pan and movable toward said head member to present said walls to said presser arms, and means for effecting reciprocation of said cam in harmony with the motion of said die member.

3. A machine for shaping metal baking pans characterized by a frusto-conical central wall and an oppositely inclined outer wall, comprising a head member, a first set of presser arms pivotally mounted on said head, a second set of presser arms pivotally mounted on said head, said sets of arms being concentrically arranged about the longitudinal axis of said head and extending in respectively divergent directions, a cam reciprocable centrally of said arms, rollers on said arms riding on said cam and so arranged on said arms as to produce opposite rocking motions of said first and second sets of arms in response to movement of said cam, a die member oppositely disposed with respect to said head member and presenting to said presser arms walls corresponding to the walls of the pan, means for effecting relative rotary and longitudinal movements of said head member and said die member, and means for effecting concomitantly with the relative longitudinal movements of said members a motion of said cam.

4. In a machine for shaping metal baking pans characterized by a frusto-conical central wall and an oppositely inclined outer wall, a rotatable head member comprising first and second sets of presser arms pivotally mounted on said head and extending forwardly thereof in respectively divergent directions, said arms being concentrically arranged about the longitudinal axis of said head, a cam reciprocable centrally of said arms, and rollers on said arms riding on said cam and so arranged on said arms as to produce respectively opposite rocking motions of said first and second sets of arms in response to movement of said cam.

5. A machine for shaping metal baking pans characterized by a frusto-conical central wall and an oppositely inclined outer wall, comprising a rotatable head member, first and second sets of presser arms pivotally mounted on said head, said arms being concentrically arranged about the longitudinal axis of said head, a cam carried by said head and reciprocable centrally of said arms, rollers on said arms riding on said cam and arranged on said arms to produce respectively opposite rocking motions of said first and second sets of arms in response to movement of said cam, a die member having walls corresponding to the walls of the pan and movable toward said head member to present said walls to said presser arms, said cam contacting said die member and moving in harmony therewith, and anti-friction means between said cam and said die member.

6. In a machine for shaping metal baking pans characterized by a frusto-conical central wall and an oppositely inclined outer wall, a head member comprising a hollow rotatable spindle, first and second sets of presser arms pivotally mounted on one end of said spindle and extending forwardly therefrom in respectively divergent directions, said arms being concentrically arranged about the longitudinal axis of the head, rolling and pressing means on the outer ends of each said arms, the arms of said first set being pivoted intermediate their ends and the arms of said second set being pivoted at their inner ends, a cam carried by said spindle and reciprocable centrally of said arms, said cam having tapered grooves lying opposite said arms, spring means recessed in said spindle and urging said cam outward relative to said arms, and rollers on said arms riding in the grooves in said cam, the rollers on said first set of arms being arranged on the inner ends thereof and the rollers on said second set of arms being arranged intermediate the ends thereof.

7. A machine for shaping metal baking pans characterized by a central frusto-conical wall, an oppositely inclined outer wall and an integral interconnecting bottom, comprising a die head having walls and a bottom corresponding to the walls and bottom of the pan, means for supporting a piece of sheet metal against the face of the die, first and second sets of presser arms operable jointly to force the sheet metal against said die and operable individually to press the metal against the respective walls of said die, means for effecting relative rotary and longitudinal motions of said arms and said die head, and means for effecting a controlled pivotal movement of said arms in conformance with the slope of the walls of said die head.

8. A machine for making a one-piece sheet metal baking pan characterized by a frusto-conical central wall and oppositely inclined outer wall, comprising a fixed support, a die member on said support presenting walls corresponding to the walls of the pan, means for holding a metal blank against the face of the die member, means on said support for applying an axial gradually outward developing rolling and pressing pressure to the blank adjacent the center thereof and means on said support for simultaneously applying an axial gradually inward developing rolling and pressing pressure to the blank outward of the center thereof whereby to spin the blank into conformance with the shape of the die member, said pressure applying means and said die member being mounted on said support in axial alignment and for relative approaching and withdrawing motions.

9. A machine for making a one-piece sheet metal baking pan characterized by a frusto-conical central wall and an oppositely inclined outer wall, comprising a fixed support, a die member on said support presenting walls corresponding to the walls of the pan, means for holding a metal blank against the face of the die member, means on said support for applying an axial rolling and pressing pressure to the blank adjacent the center thereof and means on said support for applying simultaneously a similar pressure to the blank outward of the center thereof, said pressures being applied in the direction of the die member with said pressure applying means and said die member being mounted on said support in axial alignment and for relative approaching and withdrawing motions, and control means on said support for causing the pressure applied by the first said pressure applying means gradually to develop radially outward and for causing the pressure applied by the second said pressure applying means gradually to develop radially inward.

EDWIN I. GHORMLEY.

REFERENCES CITED

The following references are of record in the file of this patent:

UNITED STATES PATENTS

| Number | Name | Date |
|---|---|---|
| 157,272 | Conger | Dec. 1, 1874 |
| 1,262,780 | Griffin | Apr. 16, 1918 |
| 1,922,087 | Hiester | Aug. 15, 1933 |
| 1,953,934 | Hiester | Apr. 10, 1934 |
| 1,968,296 | Hiester | July 31, 1934 |
| 1,994,034 | Carroll | Mar. 12, 1935 |
| 2,254,275 | Dove | Sept. 2, 1941 |
| 2,413,591 | Sturdy | Dec. 31, 1946 |

FOREIGN PATENTS

| Number | Country | Date |
|---|---|---|
| 515,445 | Germany | Dec. 28, 1926 |
| 33,330 | Netherlands | July 21, 1930 |